(12) United States Patent
Kim (10) Patent No.: US 9,047,687 B2
(45) Date of Patent: Jun. 2, 2015

(54) APPARATUS AND METHOD FOR TRANSMITTING HANDWRITING ANIMATION MESSAGE

(75) Inventor: Jung-Rim Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 536 days.

(21) Appl. No.: 13/009,379

(22) Filed: Jan. 19, 2011

(65) Prior Publication Data

US 2011/0230215 A1   Sep. 22, 2011

(30) Foreign Application Priority Data

Mar. 18, 2010   (KR) ........................ 10-2010-0024443

(51) Int. Cl.
*H04W 4/00* (2009.01)
*G06T 13/00* (2011.01)
*H04M 1/725* (2006.01)
*H04W 4/12* (2009.01)

(52) U.S. Cl.
CPC .................. *G06T 13/00* (2013.01); *H04W 4/12* (2013.01); *H04M 1/72547* (2013.01)

(58) Field of Classification Search
CPC ...... H04W 4/12; H04W 8/22; G06F 3/03545; G06F 3/04883; G06F 3/0481; G06F 3/0488; G06K 9/2081; H04M 1/72544; H04M 2215/32; H04M 1/72555; G09B 5/00; G09B 7/00; G09B 17/003; G09B 5/02
USPC ................... 455/466, 556.2, 566, 414.4, 418; 345/473, 179, 173, 419, 629, 441, 467, 345/474, 501; 379/100.01, 373; 382/187, 382/188, 315, 321, 186, 100
See application file for complete search history.

(56) References Cited

U.S. PATENT DOCUMENTS

| | | | |
|---|---|---|---|
| 5,856,825 A * | 1/1999 | Yumoto et al. | 715/201 |
| 2007/0004461 A1* | 1/2007 | Bathina et al. | 455/566 |
| 2009/0158136 A1* | 6/2009 | Rossano et al. | 715/232 |
| 2010/0067674 A1 | 3/2010 | Lee | |
| 2010/0080361 A1* | 4/2010 | Houghton | 379/87 |
| 2010/0235520 A1* | 9/2010 | Attanasio et al. | 709/228 |
| 2011/0007077 A1* | 1/2011 | Kamath et al. | 345/473 |
| 2011/0141974 A1* | 6/2011 | Lieberman | 370/328 |

FOREIGN PATENT DOCUMENTS

| | | |
|---|---|---|
| KR | 100800458 | 2/2008 |
| KR | 1020080039606 | 5/2008 |
| KR | 100859880 | 9/2008 |
| KR | 1020100020263 | 2/2010 |

* cited by examiner

*Primary Examiner* — Fred Casca
(74) *Attorney, Agent, or Firm* — The Farrell Law Firm, P.C.

(57) ABSTRACT

Provided is a server for transmitting a handwriting animation message. The server includes a receiver for receiving handwriting animation message data including coordinates and time information of points forming user input handwriting information, an information analyzer for analyzing specifications of a receiving mobile terminal which is to receive the handwriting animation message data to determine whether the receiving mobile terminal can reproduce the handwriting animation message, a data converter for converting the handwriting animation message data into a reproducible format if the receiving mobile terminal is not capable of reproducing the handwriting animation message, and a data transmitter for transmitting the converted format instead of the handwriting animation message data.

14 Claims, 8 Drawing Sheets

APPARATUS AND METHOD FOR TRANSMITTING HANDWRITING ANIMATION MESSAGE

PRIORITY

This application claims priority under 35 U.S.C. §119(a) to a Korean Patent Application filed in the Korean Intellectual Property Office on Mar. 18, 2010 and assigned Serial No. 10-2010-0024443, the contents of which are incorporated herein by reference.

BACKGROUND OF THE INVENTION

1. Field of the Invention

The present invention relates generally to message transmission, and more particularly, to an apparatus and method for transmitting a handwriting animation message.

2. Description of the Related Art

With the development of various technologies such as wired or wireless communication techniques, multimedia techniques, manufacturing techniques for hardware such as a Central Processing Unit (CPU) and a memory, and power charging techniques, an increased emphasis has been placed on functions of mobile terminals. For example, a mobile terminal conventionally transmits necessary data to a communication partner through voice communication. However, after transmission and reception of a text message become possible, desired data can be transmitted to the partner by using a Short Message Service (SMS) including simple text data in a situation where voice communication is not allowed or simple data needs to be transmitted.

The SMS has evolved into a Long Message Service (LMS) for long text data and a Multimedia Message Service (MMS) for multimedia files such as still or moving images, through which users can be provided with various benefits. In particular, the MMS that transmits a multimedia file, unlike the SMS or the LMS, which merely transmit text data, has been in increasing demand from users due to extensibility in expression. The following describes a method for transmitting desired data by using the MMS.

Figure 1:
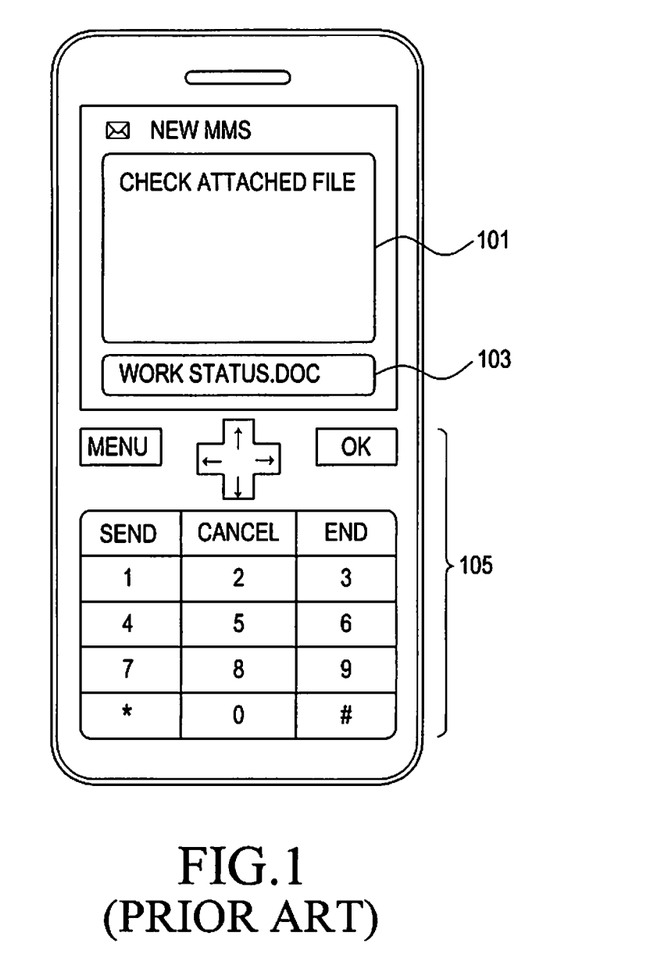
FIG. 1 illustrates a mobile terminal that executes a message service using a conventional MMS.

FIG. 1 illustrates a mobile terminal that executes a message service using a conventional MMS.

Referring to FIG. 1, a user may create an MMS message by inputting desired characters or attaching a desired image. An MMS input scheme shown in FIG. 1 is configured such that the user inputs a character using a keypad 105, but in a mobile terminal supporting a touch screen, the user may input the character directly onto the screen by using a finger or an input means such as a stylus pen. By using a file attachment box 103 provided below a character input window 101, the user may retrieve an image stored in a memory and attach the retrieved image. Next, a description will be made of a system for executing a message service by using the above-described mobile terminal.

Figure 2:
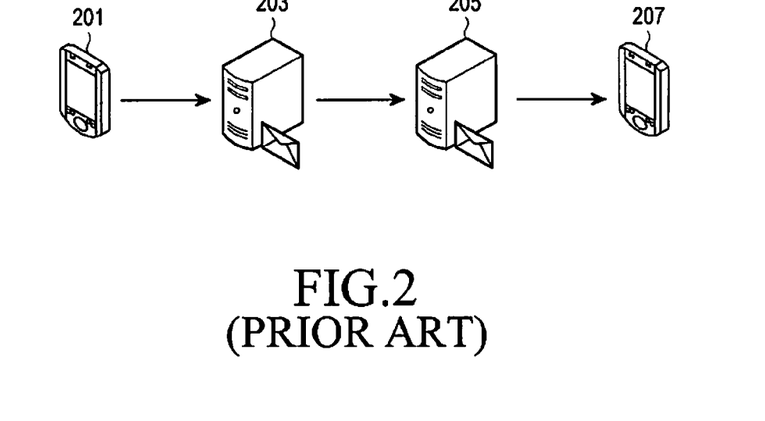
FIG. 2 illustrates a system for transmitting and receiving a message using a conventional MMS.

FIG. 2 is a schematic diagram of a system for transmitting and receiving a message by using a conventional MMS.

Referring to FIG. 2, when a transmitting mobile terminal 201 transmits an MMS service to a receiving mobile terminal 207, the transmitted MMS message is delivered to a transmitting server 203 which then transmits the MMS message to a receiving server 205 including a receiving mobile terminal 207. The receiving server 205 having received the MMS message transmits the MMS message to the receiving mobile terminal 207. In this manner, in transmission of an MMS message generated by a user of a particular mobile terminal over a mobile communication network, if the mobile communication network for transmitting the MMS message permits transmission of a file such as animation expression format information or a flash file and a receiving mobile terminal is capable of reproducing a file such as animation expression format information or a flash file, the receiving mobile terminal normally receives the MMS message. However, a conventional mobile terminal that does not support an animation reproduction method may fail to properly receive the MMS message.

As such, the mobile terminal can transmit and receive various forms of multimedia contents by using the MMS, but the MMS message may not be properly received by mobile terminals having low specifications. To this end, there is a need for a technique for converting multimedia contents suitably for low specifications of mobile terminals for transmission.

SUMMARY OF THE INVENTION

Accordingly, an aspect of the present invention is to provide an apparatus and method, by which to transmit and receive a handwriting animation message, restrictions generated during reception of a handwriting animation message are minimized and data is transmitted after being converted into various formats according to specifications of a receiving mobile terminal, such that the handwriting animation message can be transmitted to the receiving mobile terminal in which a handwriting animation program is not installed.

According to an aspect of the present invention, there is provided a server for transmitting a handwriting animation message. The server includes a handwriting animation message data receiver for receiving handwriting animation message data including coordinates information and time information of points forming handwriting information being input from a user of a transmitting mobile terminal, a receiving mobile terminal information analyzer for analyzing specifications of a receiving mobile terminal which is to receive the handwriting animation message data to determine whether the receiving mobile terminal is capable of reproducing the handwriting animation message, a handwriting animation message data converter for converting the handwriting animation message data into a format which can be reproduced by the receiving mobile terminal if the receiving mobile terminal is not capable of reproducing the handwriting animation message, and a handwriting animation message data transmitter for transmitting the converted format instead of the handwriting animation message data.

According to another aspect of the present invention, there is provided a method for transmitting a handwriting animation message. The method includes receiving handwriting animation message data including coordinates information and time information of points forming handwriting information being input from a user of a transmitting mobile terminal, analyzing specifications of a receiving mobile terminal which is to receive the handwriting animation message data to determine whether a receiving mobile terminal is capable of reproducing the handwriting animation message, converting the handwriting animation message data into a format which can be reproduced by the receiving mobile terminal if the receiving mobile terminal is not capable of reproducing the handwriting animation message, and transmitting the converted format instead of the handwriting animation message data.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF EMBODIMENTS OF THE INVENTION

Hereinafter, embodiments of the present invention will be described in detail with reference to the accompanying drawings. In the following description, details such as components are provided, but they are provided to assist a comprehensive understanding of the present invention. Accordingly, those of ordinary skill in the art will recognize that various changes and modifications of the details can be made without departing from the scope of the invention. Further, a detailed description of known functions and configurations incorporated herein will be omitted for the sake of clarity and conciseness.

Prior to description of the present invention, a handwriting animation message will be defined. A user of a transmitting mobile terminal inputs a touch by using a finger or an input means such as a stylus pen to complete a handwriting input. The input handwriting information includes one or more points, each of which includes time and coordinates information. When a message including such information of the points is transmitted to a receiving mobile terminal, the receiving mobile terminal reproduces the handwriting information based on the information included in the transmitted message as if the user of the transmitting mobile terminal directly handwrites, such that the handwriting and sensibility of the user of the transmitting mobile terminal can be animatedly carried. Such a message will be defined as the handwriting animation message. A following description will be made of a system for transmitting and receiving the handwriting animation message.

Figure 3:
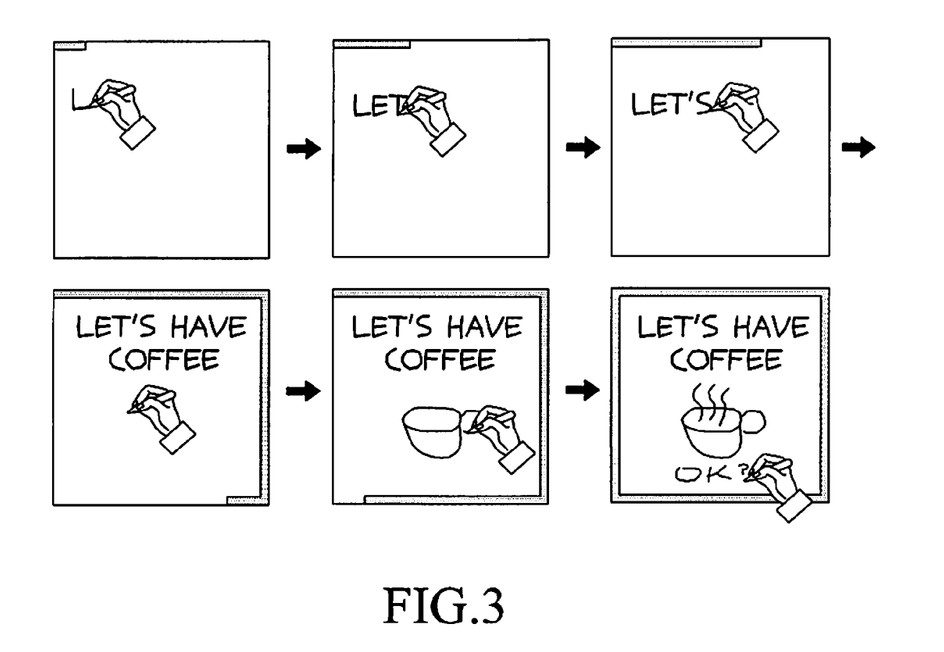
FIG. 3 illustrates a process of generating a handwriting animation message based on sequential time information according to an embodiment of the present invention.

FIG. 3 illustrates a process of generating a handwriting animation message based on sequential time information according to an embodiment of the present invention.

Referring to FIG. 3, each point includes unique coordinates information and time information, and each time when a single point or a group of points is generated, encoding is performed to generate a code. For example, when a message "Let's have coffee" is handwritten as shown in FIG. 2, different unique codes are generated according to coordinates information and time information of respective points, are temporarily stored in a memory, and the remaining amount compared to the stored amount or a preset maximum allowable encoding amount is displayed by an edge of the screen. If the handwriting animation message is no longer input or reaches the preset maximum allowable encoding amount, the input of the handwriting animation message is terminated.

Figure 4:
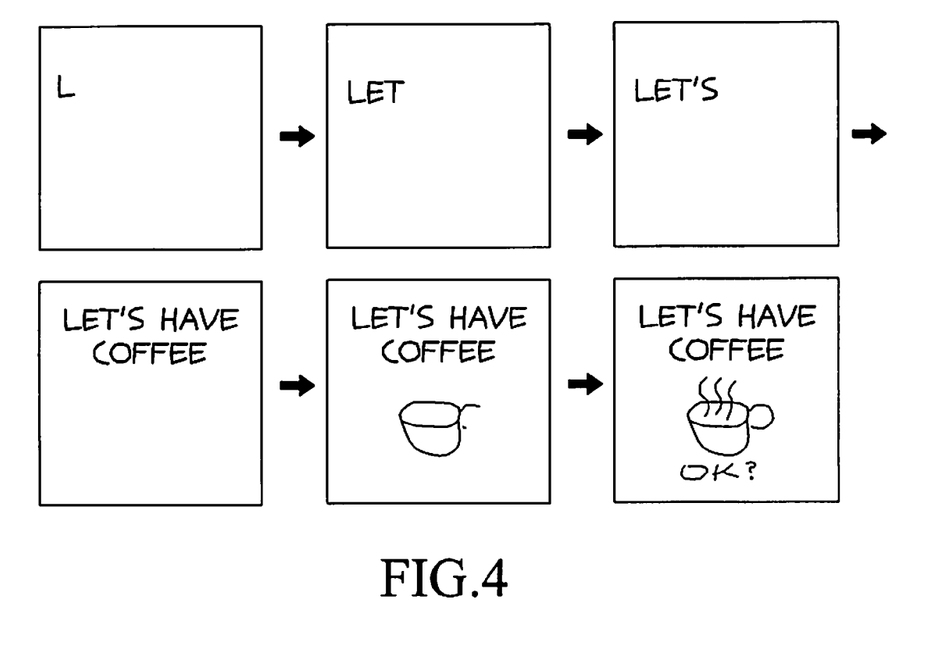
FIG. 4 illustrates a process of reproducing a handwriting animation message based on sequential time information according to an embodiment of the present invention

FIG. 4 illustrates a process of reproducing a handwriting animation message based on sequential time information according to an embodiment of the present invention.

Referring to FIG. 4, decoding is performed clockwise from a code corresponding to a start of a handwriting animation message, and the handwriting animation message is reproduced on the screen in real time. For example, if a handwriting animation message "Let's have coffee" is received, one or more codes encoded based on coordinates information and time information of respective points are decoded and those points are sequentially reproduced on the screen by using the decoded information. The one or more codes displayed by an edge of the screen of the transmitting mobile terminal are not displayed on the screen through decoding in the receiving mobile terminal.

Figure 5:
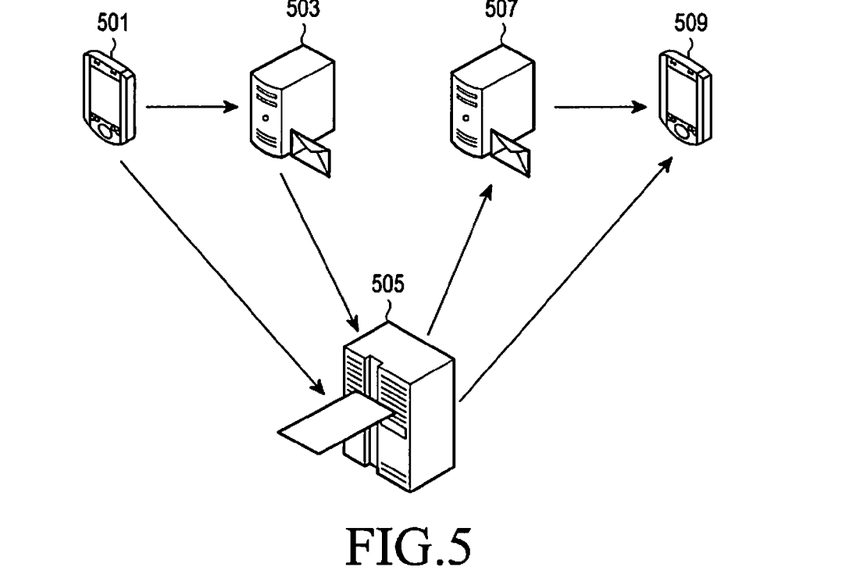
FIG. 5 illustrates a system for transmitting and receiving a handwriting animation message according to an embodiment of the present invention.

FIG. 5 illustrates a system for transmitting and receiving a handwriting animation message according to an embodiment of the present invention. The system shown in FIG. 5 includes a transmitting mobile terminal 501, a transmitting server 503, a handwriting animation server 505, a receiving server 507, and a receiving mobile terminal 509.

Referring to FIG. 5, the transmitting mobile terminal 501 generates a handwriting animation message, expresses the handwriting animation message as handwriting animation message data, and transmits the handwriting animation message data. According to a transmission target, the handwriting animation message data may be converted into pixel information and transmitted through the entire region of an MMS message or a part thereof, or may be converted into a data stream in a binary form and then transmitted. That is, when the handwriting animation message data is transmitted to the transmitting server 503, it is transmitted through the entire region of an MMS message or a part thereof. When the handwriting animation message data is transmitted directly to the handwriting animation server 505 over a data network, it is converted into a data stream in a binary form and then transmitted.

The pixel information is a marker indicating a start and an end of the handwriting animation message, a marker indicating a start and an end of a stroke, and time information and coordinates information of points forming the handwriting animation message. In the present invention, the MMS message is transmitted to the transmitting server 503, and the handwriting animation message in the data stream format is transmitted to the handwriting animation server 505, but the transmission target is subject to change according to a user's setting.

The transmitting server 503, upon receiving the MMS message including the handwriting animation message data from the transmitting mobile terminal 501, delivers the MMS message to the handwriting animation server 505.

The handwriting animation server 505 searches for specifications of the receiving mobile terminal 509 by using information such as a received phone number included in the MMS message received from the transmitting server 503, and transmits the handwriting animation message data included in the MMS message or transmits the handwriting animation message data after converting the handwriting animation message data suitably for the specifications of the receiving mobile terminal 509, according to the search result. If the receiving mobile terminal 509 is capable of reproducing the handwriting animation message, the MMS message including the handwriting animation message data is transmitted to the receiving server 507 to deliver the same to the receiving mobile terminal 509. If the receiving mobile terminal 509 is not capable of reproducing the handwriting animation message, the handwriting animation message data included in the MMS message is converted into an image that can be displayed on the receiving mobile terminal 509, such as a Joint Photographic Group (JPG) or a Graphics Interchange Format (GIF) image, or into a particular animation file format such as a flash file or a Moving Picture Group (MPG) file. The converted format, instead of the handwriting animation message data, is transmitted to the receiving server 507 through the MMS message.

The handwriting animation server 505 directly receives the handwriting animation message in a data stream format from the transmitting mobile terminal 501 over the data network, searches for specifications of the receiving mobile terminal 509 by using information included in the handwriting animation message data in the data stream format, such as a received phone number, and transmits the handwriting animation message data in the data stream format or converts the handwriting animation message into a format such as an image or a particular animation file, suitably for the specifications and then transmits the converted format according to the search result. If the receiving mobile terminal 509 is capable of reproducing the handwriting animation message and is registered in the handwriting animation server 505 by using a mobile Internet Protocol (IP), the received data stream is directly transmitted to the receiving mobile terminal 509 through the data network. A conversion process for transmission to a mobile terminal incapable of reproducing a handwriting animation message is the same as the process of converting the handwriting animation message data included in the MMS message.

The handwriting animation server 505 may transmit a guide message for downloading a handwriting animation program to the mobile terminal incapable of reproducing a handwriting animation message.

The receiving server 507 transmits the MMS message received from the handwriting animation server 505 to the receiving mobile terminal 509 which reproduces or outputs the handwriting animation message data included in the received MMS message or the converted format. The receiving mobile terminal 509 also receives the handwriting animation message data in the data stream format or the converted format from the handwriting animation server 505 over the data network and reproduces or outputs the handwriting animation message data and the converted format.

Components of the system will be described below in more detail.

Figure 6:
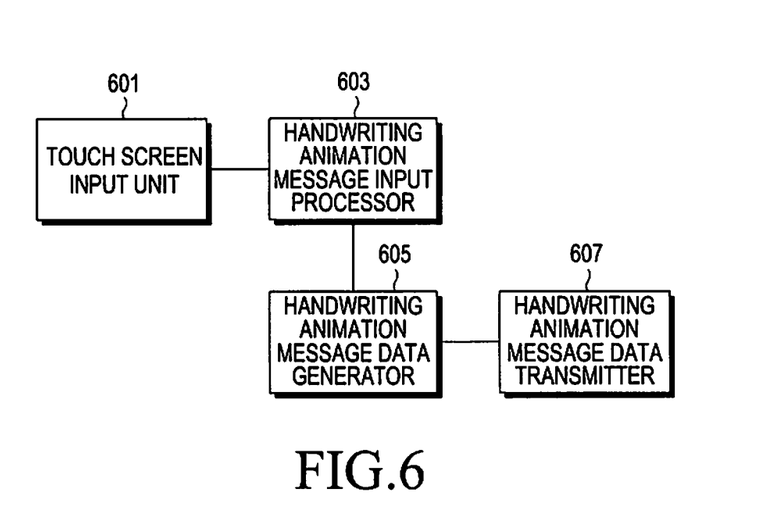
FIG. 6 illustrates components of a transmitting mobile terminal according to an embodiment of the present invention.

FIG. 6 illustrates components of a transmitting mobile terminal according to an embodiment of the present invention. The transmitting mobile terminal includes a touch screen input unit 601, a handwriting animation message input processor 603, a handwriting animation message data generator 605, and a handwriting animation message data transmitter 607.

Referring to FIG. 6, the touch screen input unit 601 receives information of points being input onto a user touch screen, and the handwriting animation message input processor 603 extracts time information and coordinates information of the input points and upon completion of user's input, generates a handwriting animation message including time information and coordinates information of all input points and expresses the handwriting animation message as handwriting animation message data. According to a target to which the handwriting animation message is to be transmitted, the handwriting animation message data generator 605 stores the handwriting animation message data in the entire region of an MMS message or a part thereof or converts the handwriting animation message into the handwriting animation message data in a data stream format. The transmission target may be selected by a user's setting or a message transmission/reception environment. The handwriting animation message data transmitter 607 transmits the MMS message including the handwriting animation message data to the transmitting server (503 of FIG. 5) or transmits the handwriting animation message data in the data stream format to the handwriting animation server (505 of FIG. 5).

Figure 7:
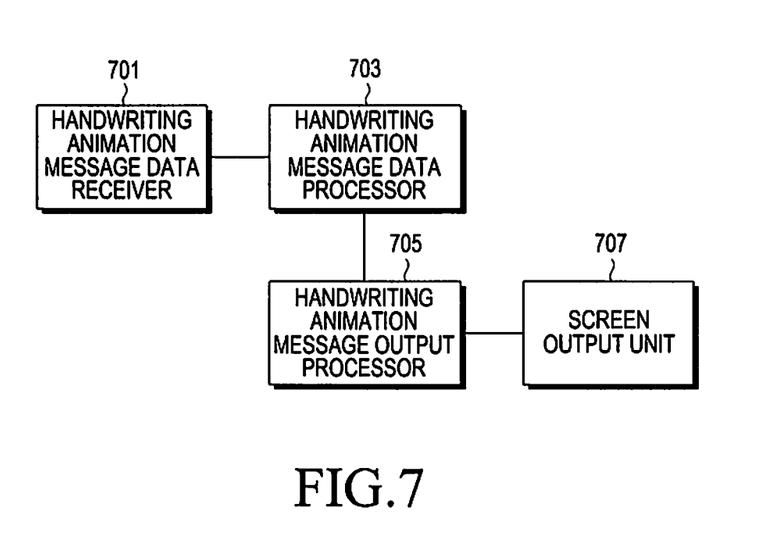
FIG. 7 illustrates components of a receiving mobile terminal according to an embodiment of the present invention.

FIG. 7 illustrates components of a receiving mobile terminal according to an embodiment of the present invention. The receiving mobile terminal includes a handwriting animation message data receiver 701, a handwriting animation message data processor 703, a handwriting animation message output processor 705, and a screen output unit 707.

Referring to FIG. 7, the handwriting animation message data receiver 701 receives an MMS message including handwriting animation message data or a data stream format of handwriting animation message data from the transmitting server (503 of FIG. 5). The handwriting animation message data processor 703 analyzes the handwriting animation message data included in the received MMS message or the handwriting animation message data in the data stream format and converts the handwriting animation message data into a format which can be displayed by the receiving mobile terminal. The format that can be displayed includes one or more points, each of which has unique time information and coordinates information. The handwriting animation message output processor 705 sequentially outputs the handwriting animation message generated by the user of the transmitting mobile terminal by using the time information and coordinates information of the one or more points. The screen output unit 707 sequentially outputs the one or more points at corresponding coordinates by using the time information and the coordinates information.

Figure 8:
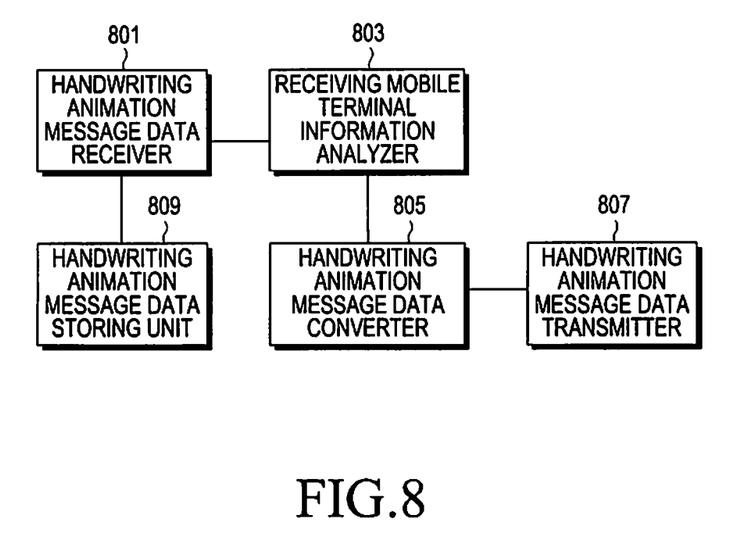
FIG. 8 illustrates components of a handwriting animation server according to an embodiment of the present invention.

FIG. 8 illustrates components of a handwriting animation server according to an embodiment of the present invention. The handwriting animation server includes a handwriting animation message data receiver 801, a receiving mobile terminal information analyzer 803, a handwriting animation message data converter 805, a handwriting animation message data transmitter 807, and a handwriting animation message data storing unit 809.

Referring to FIG. 8, the handwriting animation message data receiver 801 receives an MMS message including handwriting animation message data from the transmitting server (503 of FIG. 5) or receives a data stream format of handwriting animation message data from the transmitting mobile terminal over the data network. The receiving mobile terminal information analyzer 803 analyzes specifications of the receiving mobile terminal by using information such as a received phone number included in the received MMS or handwriting animation message data to determine whether the receiving mobile terminal is capable of reproducing a handwriting animation message. If the receiving mobile terminal cannot reproduce a handwriting animation message, the handwriting animation message data converter 805 converts the handwriting animation message data included in the MMS message or the handwriting animation message data in the data stream format into a format that can be displayed by the receiving mobile terminal and expresses the format as data.

The handwriting animation message data transmitter 807 transmits the converted format expressed as the data, instead of the handwriting animation message data, to the receiving server through the MMS message. The handwriting animation message data storing unit 809 stores the handwriting animation message data in the data stream format received from the transmitting mobile terminal and the MMS message including the handwriting animation message data received from the transmitting server.

A description will now be made of operations of the above-described components.

Figure 9:
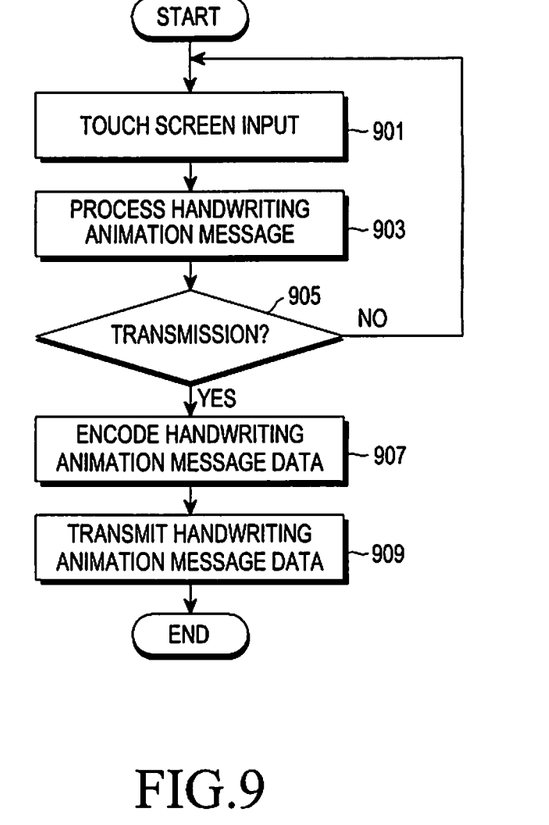
FIG. 9 illustrates operations of a transmitting mobile terminal according to an embodiment of the present invention.

FIG. 9 illustrates operations of the transmitting mobile terminal according to an embodiment of the present invention.

Referring to FIG. 9, in step 901, the transmitting mobile terminal receives information of points being input on the user touch screen. In step 903, the transmitting mobile terminal extracts time information and coordinates information of the input points, generates a handwriting animation message including the time information and the coordinates information of the input points, and expresses the handwriting animation message as handwriting animation message data. In step 905, the transmitting mobile terminal determines whether to transmit the handwriting animation message data. If the transmitting mobile terminal determines not to perform the transmission, it regards the user input as not being completed and steps 901 and 903 are repeated. If the transmitting mobile terminal determines to perform the transmission, the transmitting mobile terminal stores the handwriting animation message data in the entire region of the MMS message or a part thereof or converts the handwriting animation message data into the handwriting animation message data in the data stream format, according to a transmission target, and then encodes the handwriting animation message data in step 907. In step 909, the transmitting mobile terminal transmits the MMS including the handwriting animation message data to the transmitting server or the handwriting animation message data in the data stream format to the handwriting animation server.

Figure 10:
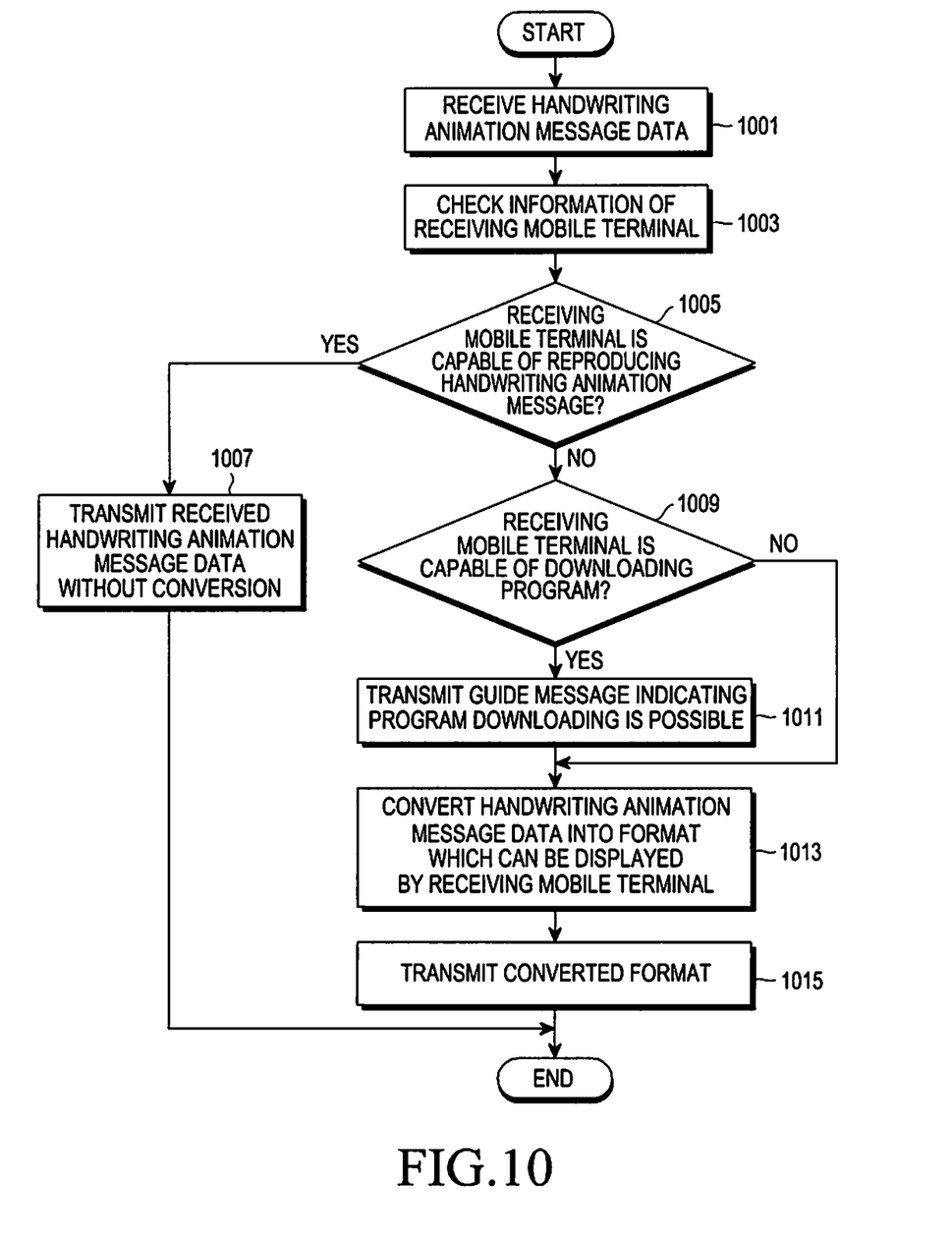
FIG. 10 illustrates operations of a handwriting animation server according to an embodiment of the present invention.

FIG. 10 illustrates operations of the handwriting animation server (505 of FIG. 5) according to an embodiment of the present invention.

Referring to FIG. 10, in step 1001, the handwriting animation server receives an MMS message including handwriting animation message data from the transmitting server (503 of FIG. 5) or handwriting animation message data in a data stream format from the transmitting mobile terminal over the data network. In step 1003, the handwriting animation server analyzes specifications of the receiving mobile terminal by using information such as a received phone number included in the received MMS message or handwriting animation message data in the data stream format. In step 1005, the handwriting animation server determines whether the receiving mobile terminal is capable of reproducing a handwriting animation message. If the receiving mobile terminal is capable of reproducing a handwriting animation message, the handwriting animation server proceeds to step 1007 to transmit the handwriting animation message data included in the received MMS or the handwriting animation message data in the data stream format without conversion.

If the receiving mobile terminal is incapable of reproducing a handwriting animation message, the handwriting animation server proceeds to step 1009 to determine whether the receiving mobile terminal can download a program. If the receiving mobile terminal can download a program, the handwriting animation server proceeds to step 1011 to transmit a guide message indicating program downloading is possible to the receiving mobile terminal. In step 1013, the handwriting animation server converts the handwriting animation message data included in the MMS message or the handwriting animation message data in the data stream format into a format that can be displayed by the receiving mobile terminal and expresses the converted format as data. In step 1015, the handwriting animation message data transmitter transmits the format expressed as the data, instead of the handwriting animation message data, to the receiving server through the MMS message, or to the receiving mobile terminal over the data network. If the receiving mobile terminal is incapable of downloading a program, the handwriting animation server proceeds to step 1013 to sequentially perform steps 1013 and 1015.

Figure 11:
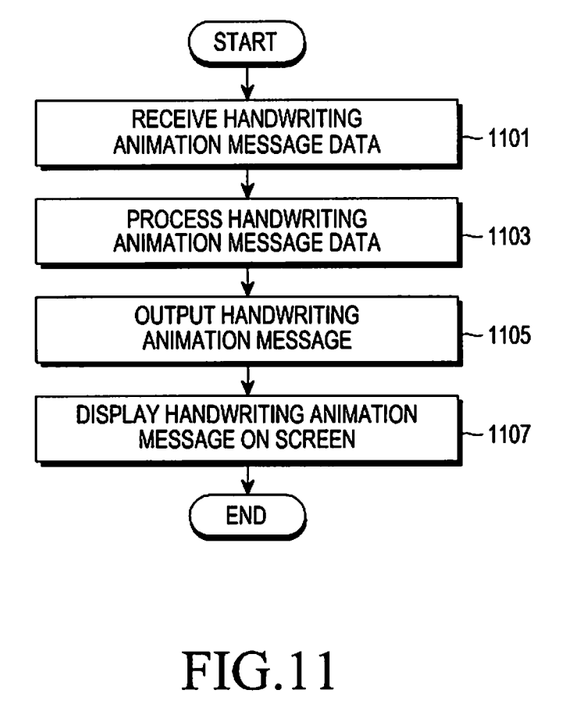
FIG. 11 illustrates operations of a receiving mobile terminal according to an embodiment of the present invention.

FIG. 11 illustrates operations of the receiving mobile terminal according to an embodiment of the present invention.

Referring to FIG. 11, in step 1101, the receiving mobile terminal receives the MMS message including the handwriting animation message data from the transmitting server or the handwriting animation message data in the data stream format from the handwriting animation server. In step 1103, the receiving mobile terminal analyzes the handwriting animation message data included in the received MMS message or the handwriting animation message data in the data stream format to convert the handwriting animation message data into a format that can be displayed by the receiving mobile terminal. The format that can be displayed includes one or more points, each of which includes unique time information and coordinates information. In step 1105, the receiving mobile terminal performs processing by using the time information and the coordinates information of the converted one or more points to sequentially output a handwriting animation message generated by the user of the transmitting mobile terminal. In step 1107, the receiving mobile terminal sequentially displays the one or more points to corresponding coordinates by using the time information and the coordinates information.

In this manner, the handwriting animation sever analyzes the specifications of the receiving mobile terminal and converts the handwriting animation message into a format which can be output by the receiving mobile terminal, whereby the transmitting mobile terminal or the receiving mobile terminal can transmit or receive the handwriting animation message without having to include separate conversion equipment.

As can be appreciated from the foregoing description, when the receiving mobile terminal does not support the handwriting animation message, the handwriting animation server converts the handwriting animation message into another format suitable for specifications of the receiving mobile terminal before transmission, thereby allowing viewing of the handwriting animation message even if the receiving mobile terminal does not support various formats.

While the invention has been shown and described with reference to a certain preferred embodiment thereof, it will be understood by those skilled in the art that various changes in form and details may be made therein without departing from the spirit and scope of the invention as defined by the appended claims and equivalents thereof.

What is claimed is:

1. A server for transmitting a handwriting animation message, the server comprising:
 a handwriting animation message data receiver for receiving handwriting animation message data including coordinates information and time information of points forming handwriting information being input from a user of a transmitting mobile terminal;
a receiving mobile terminal information analyzer for analyzing specifications of a receiving mobile terminal, which is to receive the handwriting animation message data, to determine whether the receiving mobile terminal is capable of using the coordinates information and the time information to reproduce the handwriting animation message;
a handwriting animation message data converter for converting the handwriting animation message data into a format which can be reproduced by the receiving mobile terminal when the receiving mobile terminal is not capable of using the coordinates information and the time information to reproduce the handwriting animation message; and
a handwriting animation message data transmitter for transmitting the handwriting animation message data when the receiving mobile terminal is capable of using the coordinates information and the time information to reproduce the handwriting animation message, and for transmitting the converted format when the receiving mobile terminal is not capable of using the coordinates information and the time information to reproduce the handwriting animation message.

2. The server of claim 1, wherein the handwriting animation message data receiver receives a Multimedia Message Service (MMS) message including the handwriting animation message data from a transmitting server or receives the handwriting animation message data converted into a data stream format from the transmitting mobile terminal over a data network.

3. The server of claim 1, wherein the receiving mobile terminal information analyzer analyzes the specifications of the receiving mobile terminal by using a received phone number included in an MMS message including the handwriting animation message data or the handwriting animation message data in a data stream format.

4. The server of claim 1, wherein the handwriting animation message data transmitter transmits the converted format, instead of the handwriting animation message data, to a receiving server through an MMS message or transmits the converted format to the receiving mobile terminal over a data network.

5. The server of claim 1, further comprising a handwriting animation message data storing unit for storing the handwriting animation message data.

6. A method for transmitting a handwriting animation message, the method comprising:
receiving handwriting animation message data including coordinates information and time information of points forming handwriting information being input from a user of a transmitting mobile terminal;
analyzing specifications of a receiving mobile terminal which is to receive the handwriting animation message data to determine whether the receiving mobile terminal is capable of using the coordinates information and the time information to reproduce the handwriting animation message;
when the receiving mobile terminal is not capable of using the coordinates information and the time information to reproduce the handwriting animation message, converting the handwriting animation message data into a format which can be reproduced by the receiving mobile terminal, and transmitting the converted format; and
when the receiving mobile terminal is not capable of using the coordinates information and the time information to reproduce the handwriting animation message, transmitting the handwriting animation message data.

7. The method of claim 6, wherein the receiving of the handwriting animation message data comprises receiving a Multimedia Message Service (MMS) message including the handwriting animation message data from a transmitting server.

8. The method of claim 6, wherein the receiving of the handwriting animation message data comprises receiving the handwriting animation message data converted into a data stream format from the transmitting mobile terminal over a data network.

9. The method of claim 6, wherein the determining of whether the receiving mobile terminal is capable of reproducing the handwriting animation message comprises:
analyzing the specifications of the receiving mobile terminal by using a received phone number included in the Multimedia Message Service (MMS) message including the handwriting animation message data or the handwriting animation message data in the data stream format; and
determining whether the receiving mobile terminal is capable of reproducing the handwriting animation message by using the analyzed specifications of the receiving mobile terminal.

10. A system for transmitting a handwriting animation message, the system comprising:
a transmitting mobile terminal for generating the handwriting animation message including coordinates information and time information of points forming handwriting information being input from a user of a transmitting mobile terminal, expressing the handwriting animation message as handwriting animation message data, and transmitting the handwriting animation message data;
a transmitting server for transmitting the received handwriting animation message data;
a handwriting animation server for analyzing specifications of a receiving mobile terminal which is to receive the handwriting animation message data to determine whether the receiving mobile terminal is capable of using the coordinates information and the time information to reproduce the handwriting animation message, transmitting the handwriting animation message data when the receiving mobile terminal is capable of using the coordinates information and the time information to reproduce the handwriting animation message, and, when the receiving mobile terminal is not capable of using the coordinates information and the time information to reproduce the handwriting animation message, converting the handwriting animation message data into a format which can be reproduced by the receiving mobile terminal and transmitting the converted format;
a receiving server for transmitting the handwriting animation message data or the converted format, which is received from the handwriting animation server; and
the receiving mobile terminal for reproducing the handwriting animation message data or the converted format, which is received from the receiving server or the handwriting animation server.

11. The system of claim 10, wherein the transmitting mobile terminal transmits the handwriting animation message data to the transmitting server through a Multimedia Message Service (MMS) message, or converts the handwriting animation message data into a data stream in a binary form and transmits the data stream to the handwriting animation server over a data network.

12. The system of claim 10, wherein the handwriting animation server converts the handwriting animation message data into the format such as an image or a particular animation file and transmits the converted format if the receiving mobile terminal is capable of using the coordinates information and the time information to reproduce the handwriting animation message.

13. The system of claim 12, wherein the handwriting animation server, upon receiving the handwriting animation message data from the transmitting mobile terminal over the data network, transmits the handwriting animation message data to the receiving mobile terminal or the converted format to the receiving mobile terminal.

14. The system of claim 12, wherein the handwriting animation server, upon receiving an MMS message including the handwriting animation message data from the receiving server, transmits the handwriting animation message data, or transmits the converted format, instead of the handwriting animation message data, to the receiving server through the MMS message.

\* \* \* \* \*